W. H. BODENHAMER.
Car-Coupling.
No. 164,961. Patented June 29, 1875.
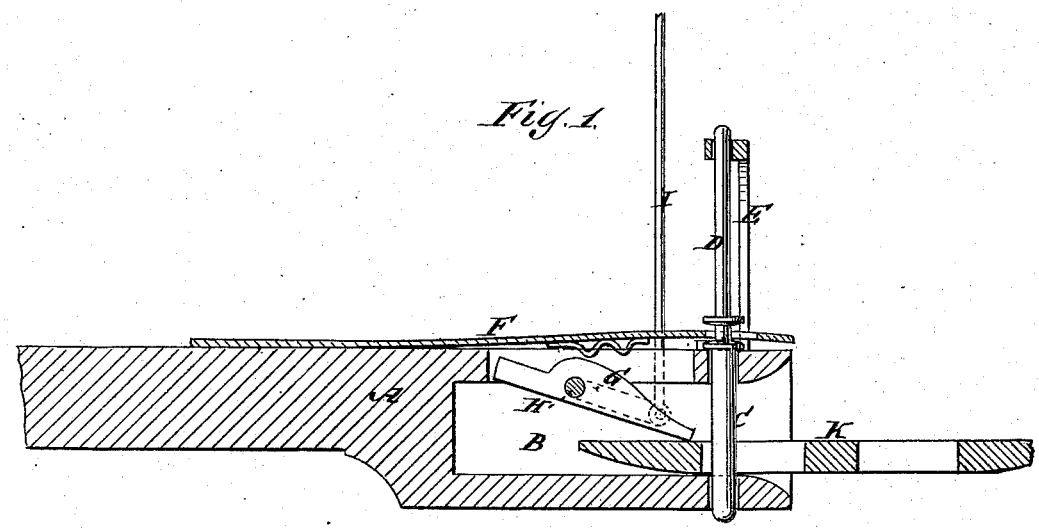
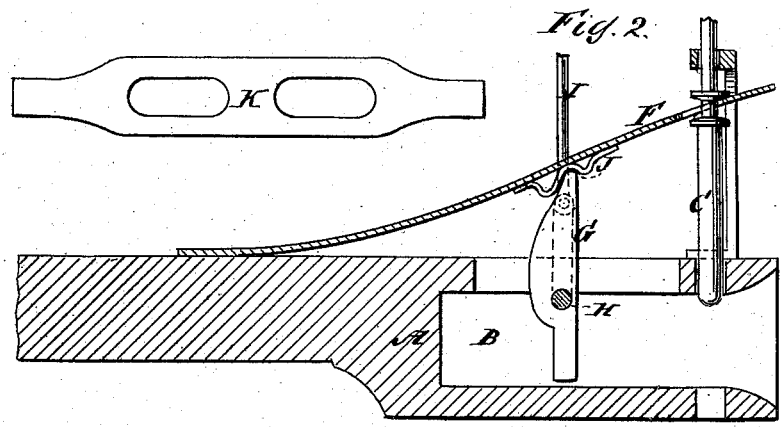
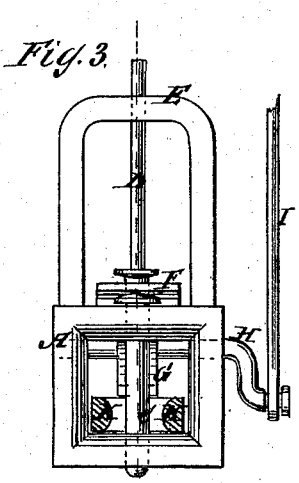

UNITED STATES PATENT OFFICE.

WILLIAM H. BODENHAMER, OF XENIA, KANSAS.

IMPROVEMENT IN CAR-COUPLINGS.

Specification forming part of Letters Patent No. 164,961, dated June 29, 1875; application filed April 17, 1875.

*To all whom it may concern:*

Be it known that I, WILLIAM HARRISON BODENHAMER, of Xenia, in the county of Bourbon and State of Kansas, have invented a new and Improved Car-Coupling, of which the following is a specification:

This invention consists of the coupling pin, fixed in a guide above the draw-head, to work up and down truly, and also fixed in the end of a spring for lifting it, the spring being extended rearward along the draw-head, to which it is connected, and under the spring, between the coupling-pin and the point where the spring is fastened, is a setting and tripping dog on a crank-shaft, by which the pin can be held up to allow the coupling-link to enter, and then let fall, for self-coupling, when the link strikes the dog.

Figure 1 is a longitudinal sectional elevation of my improved coupling in the coupled condition. Fig. 2 is a similar section of the coupling as when set for self-coupling, and Fig. 3 is a front elevation. Fig. 4 is a plan of the coupling-link.

Similar letters of reference indicate corresponding parts.

A is the draw-head, with the usual chamber B for the link. C is the pin, which has an extension, D, of the upper end to run in the guide E. F is the spring for lifting the pin. G is the setting and tripping dog. H is the crank-shaft, on which the dog turns, and I is a rod for turning the dog to raise up and hold the spring. By pulling upon the rod I the dog swings up and raises the spring, which lifts the pin, and it drops into a notch, J, in the under side of the spring, to hold the spring firmly. When the link K enters the socket it strikes the lower end of the dog and knocks it down in the position represented in Fig. 1, letting the pin fall through the link.

Having thus described my invention, I claim as new and desire to secure by Letters Patent—

The spring F, placed on top of draw-head, and provided with subjacent notch J, combined with a tripper, G, arranged on crank of shaft H, as and for the purpose specified.

WILLIAM HARRISON BODENHAMER.

Witnesses:
JOHN S. W. STEVENSON,
JOHN H. DECKER.